United States Patent [19]

Isoyama et al.

[11] Patent Number: 4,778,621
[45] Date of Patent: Oct. 18, 1988

[54] ESTER COMPOUND

[75] Inventors: Toyoshiro Isoyama; Tetsuya Ogawa, both of Yokohama; Shigeru Sugimori, Musashino, all of Japan

[73] Assignee: Chisso Corporation, Japan

[21] Appl. No.: 917,491

[22] Filed: Oct. 10, 1986

[30] Foreign Application Priority Data

Oct. 14, 1985 [JP] Japan .................. 60-228346

[51] Int. Cl.$^4$ .................. G02F 1/13; C09K 19/12; C09K 19/30; C07C 69/76
[52] U.S. Cl. .................. 252/299.65; 252/299.63; 350/350 R; 350/350 S; 560/59; 560/73; 560/102; 560/108; 560/126; 560/138; 560/141
[58] Field of Search ............ 252/299.65, 299.67, 252/299.01, 299.5, 299.63; 350/350 S, 350 R; 560/59, 73, 102, 108, 126, 141, 138

[56] References Cited

U.S. PATENT DOCUMENTS

| 3,790,498 | 2/1974 | Katagiri et al. | 252/299.67 |
| 4,013,582 | 3/1977 | Gavrilovic | 252/299.63 |
| 4,029,594 | 6/1977 | Gavrilovic et al. | 252/299.65 |
| 4,065,489 | 12/1977 | Steinstrasser | 252/299.65 |
| 4,113,647 | 9/1978 | Coates et al. | 252/299.63 |
| 4,473,487 | 9/1984 | Romer et al. | 252/299.63 |
| 4,478,741 | 10/1984 | Nakagawa et al. | 252/299.63 |
| 4,576,732 | 3/1986 | Isogai et al. | 252/299.67 |
| 4,589,996 | 5/1986 | Inoue et al. | 252/299.65 |
| 4,613,209 | 9/1986 | Goonby et al. | 252/299.01 |
| 4,645,305 | 2/1987 | Yokokura et al. | 252/299.63 |
| 4,647,398 | 3/1987 | Saito et al. | 252/299.65 |
| 4,728,458 | 3/1988 | Higuchi et al. | 252/299.65 |

FOREIGN PATENT DOCUMENTS

| 56501 | 7/1982 | European Pat. Off. | 252/299.63 |
| 191600 | 8/1986 | European Pat. Off. | 252/299.65 |
| 60-23476 | 2/1985 | Japan | 252/299.63 |
| 60-237049 | 11/1985 | Japan | 252/299.67 |
| 61-68449 | 4/1986 | Japan | 252/299.66 |
| 2092169 | 8/1982 | United Kingdom | 252/299.63 |

Primary Examiner—Teddy S. Gron
Attorney, Agent, or Firm—Leydig, Voit & Mayer

[57] ABSTRACT

A novel ester compound which, when added to a liqud crystal composition, can raise its nematic phase-isotropic liquid phase transition point without raising its viscosity, and a liquid crystal composition containing the same are provided, which ester compound is expressed by the formula

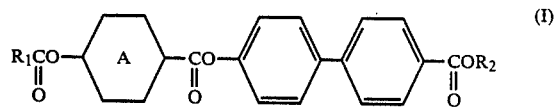

(I)

wherein $R_1$ and $R_2$ each represents a linear chain alkyl group of 1 to 10 C and

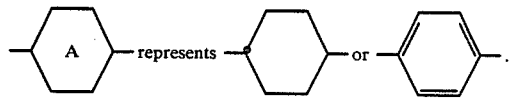

5 Claims, No Drawings

ESTER COMPOUND

BACKGROUND OF THE INVENTION

1. Field of the Invention

This invention relates to a novel ester compound and a liquid crystal composition containing the same.

2. Description of the Prior Art

Display elements utilizing liquid crystals have been generally used for watches, electric calculators, etc. These liquid crystal display elements utilize the optical anisotropy and the dielectric anisotropy of liquid crystal substances. The liquid crystal phases include nematic liquid crystal phase, smectic liquid crystal phase and cholesteric liquid crystal phase, and display elements utilizing nematic liquid crystal phase among these phases have most frequently been used in practice. These display elements include those of TN (twisted nematic) type, DS (dynamic scattering) type, guest-host type, DAP type, etc., corresponding to the electrooptical effect applied to liquid crystal displays, and the liquid crystal substances used for the respective display elements are preferred to be those which exhibit liquid crystal phases within as broad a temperature range as possible in the natural world. Many liquid crystal compounds are known, but at present, there is no single substance which satisfies such a condition, hence several kinds of liquid crystal substances or non-liquid substances have been mixed and the mixtures have been applied to practical uses. These substances have been required to be stable to moisture, light, heat, air, etc.

The mixtures of the liquid crystal substances, etc. as described above, i.e. liquid crystal compositions, have been required to have an elevated usable temperature range, i.e. the nematic temperature range as high as possible, and it has been required that when the compounds are added as a constituting component of the liquid crystal compounds thereto, the nematic phase-isotropic liquid phase transition point thereof is raised without elevating the viscosity thereof, and a liquid crystal composition containing the same.

SUBJECT OF THE INVENTION

The object of the present invention is to provide a novel compound useful as a liquid crystal compound which satisfies the above-mentioned requirements.

One of the present co-inventors previously found, as a compound similar to the objective compound of the present invention, a compound expressed by the formula

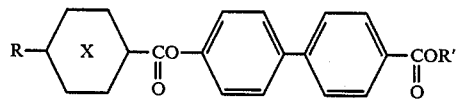

wherein R represents an alkyl group or an alkoxy group each of 1 to 15 carbon atoms;

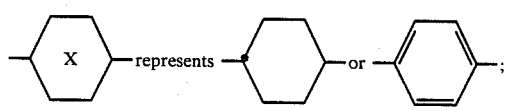

and R' represents an alkyl group 1 to 15 carbon atoms, and applied for a patent on the compound (Japanese patent application laid-open No. Sho 60-23,476/1985).

The compound of the present invention has a higher melting point and N-I point than those of the above-mentioned compound.

The present invention resides in an ester compound expressed by the formula

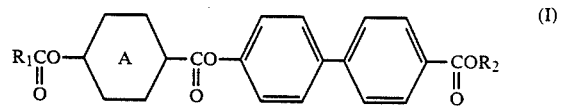

wherein $R_1$ and $R_2$ each represent a linear chain alkyl of 1 to 10 carbon atoms and

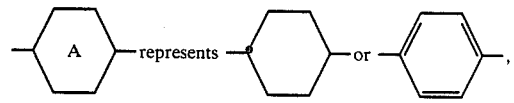

and a liquid crystal composition containing the same as at least one component thereof.

DETAILED DESCRIPTION OF PREFERRED EMBODIMENTS

Concrete examples of the linear chain alkyl groups $R_1$ and $R_2$ are methyl group, ethyl group, propyl group, butyl group, pentyl group, hexyl group, heptyl group, octyl group, nonyl group, and decyl group. Further, $R_1$ and $R_2$ may be same or different.

Further, the liquid crystal composition of the present invention includes the ester compound of the present invention expressed by the formula (I) as at least one component of the composition.

Examples of components other than the compound of the present invention, usable as those of the liquid crystal composition of the present invention are esters, Schiff's base compounds, biphenyls, phenylcyclohexanes, heterocyclic compounds, etc.

Concrete examples of these compounds are those expressed by the following formulas (i)~(xxxiii):

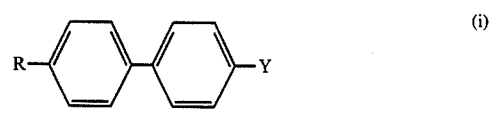

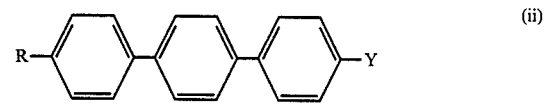

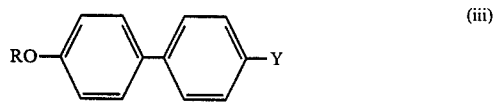

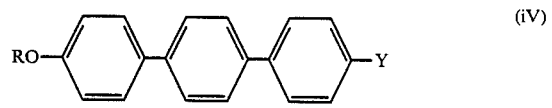

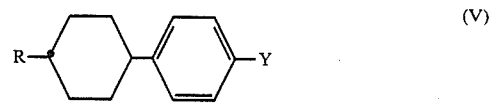

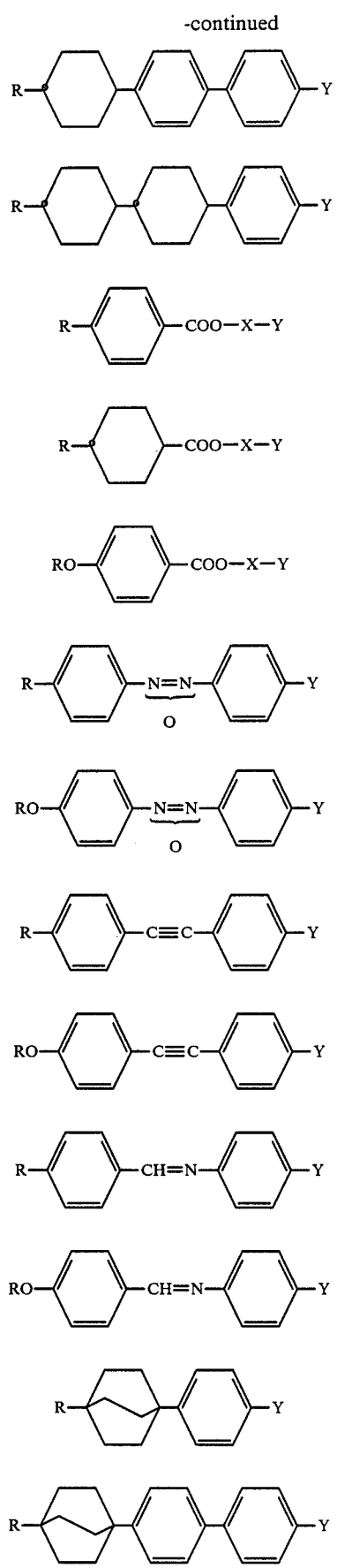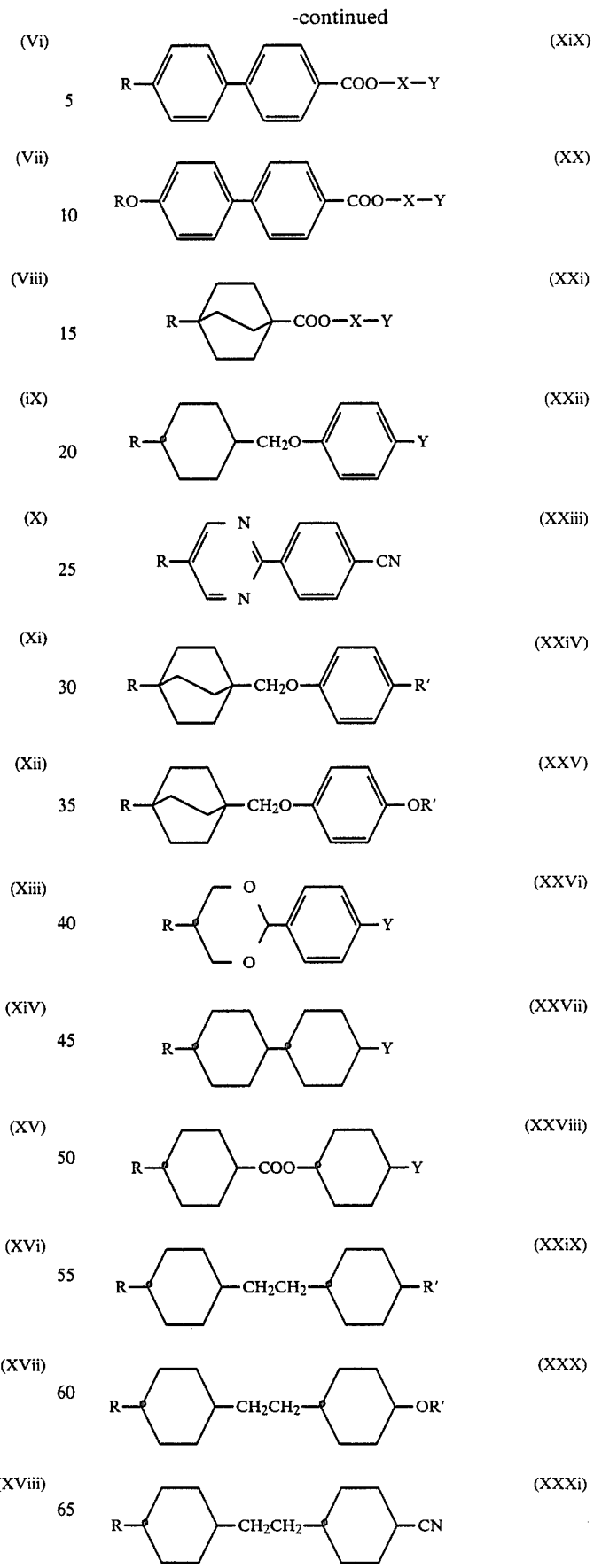

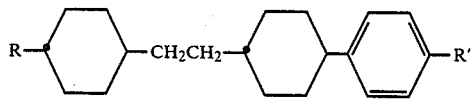
(XXXii)

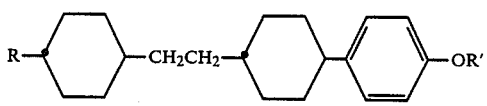
(XXXiii)

In the above formulas (i)~(xxxiii), X represents

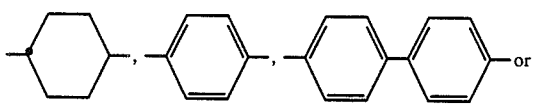

Y represents —CN, a halogen atom, R' or —OR; and R and R' each represent an alkyl group.

The compound of the present invention exhibits smectic liquid crystal phase and nematic liquid crystal phase within a relatively high temperature range, has a good compatibility with many other liquid crystal compounds i.e. esters, Schiff's base compounds, biphenyls, phenylcyclohexanes, heterocyclic compounds, etc. and when the compound of the present invention is added in a small quantity to liquid crystal compositions, it is possible to raise the N-I point of the compositions.

Preparation of the compound of the present invention may be shown by the following reaction equations:

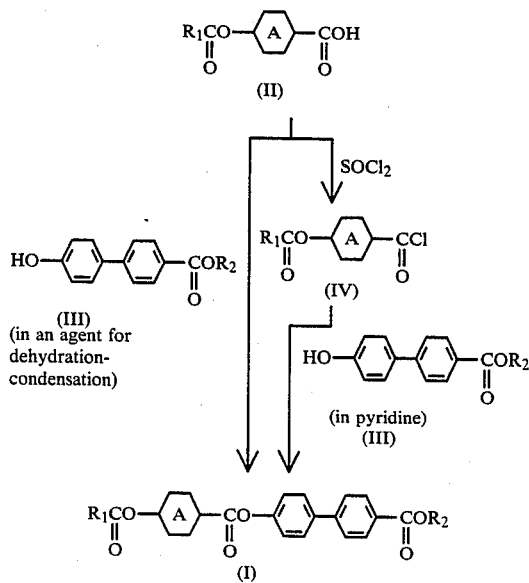

In the above equations, $R_1$, $R_2$ and

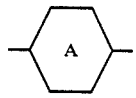

are as defined above.

When a carboxylic acid (compound (II)) and an alkyl 4'-hydroxy-4-biphenylylcarboxylate (compound (III)) each corresponding to the final objective product are reacted using a suitable agent for dehydration-condensation such as sulfuric acid, boric acid, p-toluenesulfonic acid, N,N'-dicyclohexylcarbodiimide, etc. in a solvent such as benzene, toluene, xylene, dichloromethane, chloroform, carbon tetrachloride, etc., it is possible to obtain the objective ester compound (I). Further, when the carboxylic acid (compound (II)) is converted into the corresponding acid chloride (compound (IV)) by means of a chlorinating agent such as thionyl chloride, phosphorus pentachloride, etc. and the resulting chloride is reacted with the alkyl 4'-hydroxy-4-biphenylylcarboxylate (compound (III)) in the presence of pyridine, it is also possible to obtain the objective ester compound.

The compound of the present invention will be described in more detail by way of Examples.

EXAMPLE 1

Preparation of ethyl 4'-(4-propanoyloxybenzoyloxy)-4-biphenylylcarboxylate

4-Propanoyloxybenzoic acid (7.0 g, 0.036 mol) together with thionyl chloride (40 ml) were heated at 80° C. for 3 hours, followed by distilling off excess thionyl chloride by azotropic distillation with toluene to obtain an oily acid chloride, adding a solution of ethyl 4'-hydroxy-4-biphenylylcarbonylate (8.8 g, 0.036 mol) dissolved in pyridine (20 ml) and toluene (50 ml) to a solution of the above acid chloride dissolved in toluene (20 ml), with stirring, heating the mixture at 60° C. for 3 hours, thereafter adding water (100 ml) and chloroform (100 ml) to the reaction mixture, agitating the resulting mixture, separating the organic layer, washing it with 6N hydrochloric acid, then with 2N NaOH and further with water, drying with anhydrous sodium sulfate, distilling off chloroform and toluene under reduced pressure and recrystallizing residual white solids from ethyl acetate to obtain the objective ethyl 4'-(4-propanoyloxybenzoyloxy)-4-biphenylylcarboxylate (10.3 g, 0.025 mol) (yield: 69%). This product exhibited liquid crystal phases and the crystalline-smectic phase transition point was 153.4° C.; the smectic phase-nematic phase transition point (S-N point), 179.0° C.; and the N-I point, 300° C. or higher. Further, its elementary analysis values were as follows:

C: 72.05%, H: 5.27% (calculated values in terms of molecular formula $C_{55}H_{22}O_6$—C: 71.76%, H: 5.30%).

EXAMPLES 2~4

Operation was carried out in the same manner as in Example 1 except that 4-propanoyloxybenzoic acid in Example 1 was replaced by carboxylic acids corresponding to the final objective products to prepare compounds of the formula (I) shown in Table 1. The results of phase transition points and elementary analysis of these compounds are shown in the Table 1 with those of Example 1.

TABLE 1

| Example | R₁ (formula I) | A ring | R₂ | C | S | N | I | Molecular formula | Elementary analysis (wt %) C | H | Calculated (wt %) C | H |
|---|---|---|---|---|---|---|---|---|---|---|---|---|
| 1 | $C_2H_5$ | phenylene | $C_2H_5$ | • 153.4 | • 179.0 | • >300 | • | $C_{25}H_{22}O_6$ | 72.05 | 5.27 | 71.76 | 5.30 |
| 2 | $C_3H_7$ | phenylene | $C_2H_5$ | • 156.6 | { 187.8 | • 300 | • | $C_{26}H_{24}O_6$ | 72.31 | 5.59 | 72.21 | 5.59 |
| 3 | $C_4H_9$ | phenylene | $C_2H_5$ | • 161.5 | • 192.2 | • >300 | • | $C_{27}H_{26}O_6$ | 72.90 | 5.91 | 72.63 | 5.87 |
| 4 | $C_5H_{11}$ | phenylene | $C_2H_5$ | • 150.6 | • 192.2 | • >300 | • | $C_{23}H_{28}O_6$ | 73.18 | 6.20 | 73.03 | 6.13 |

In the above column of phase transition point, C, S, N and I represent crystalline phase, smectic phase, nematic phase and isotropic phase, respectively, and the symbol • therebelow shows that the above phases are present there.

EXAMPLES 5~8

A liquid crystal mixture (A) consisting of

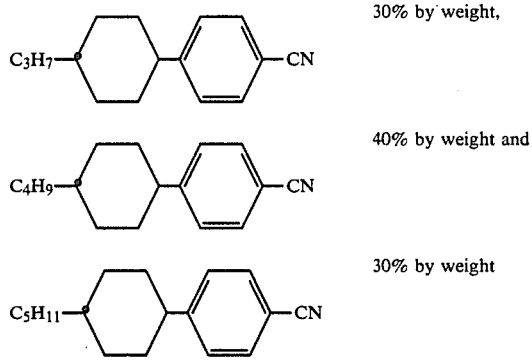

has a N-I point of 52.1° C.

The respective ester compounds prepared in Examples 1~4 of the present invention each in a quantity of 2% by weight were added to 98% by weight of the above liquid crystal (A), and the resulting compositions had N-I points shown in Table 2, respectively. It is noted that the N-I points of these compositions increase by the addition of the compounds of the present invention.

TABLE 2

| Example | Compound added | N-I point (°C.) |
|---|---|---|
| 5 | Compound of Example 1 | 54.5 |
| 6 | Compound of Example 2 | 54.0 |
| 7 | Compound of Example 3 | 54.2 |
| 8 | Compound of Example 4 | 54.4 |

What we claim is:

1. An ester compound expressed by the formula

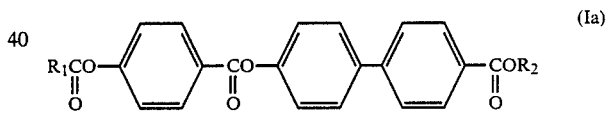

(Ia)

wherein R₁ and R₂ each represent a linear chain alkyl group of 1 to 10 carbon atoms.

2. An ester compound according to claim 1 wherein R₁ represents $C_2H_5$ and R₂ represents $C_2H_5$.

3. A liquid crystal composition having at least two components at least one of which is an ester compound expressed by the formula (Ia) as set forth in claim 1.

4. An ester compound expressed by the formula

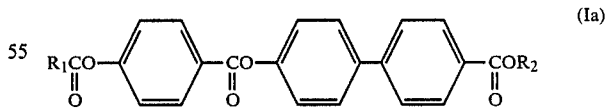

(Ia)

wherein R₁ represents a linear chain alkyl group of 2 to 5 carbon atoms and R₂ represents $C_2H_5$.

5. A liquid crystal composition having at least two components, at least one of which is an ester compound expressed by the formula (Ia) as set forth in claim 4.

* * * * *